US012444873B2

(12) United States Patent
Yu

(10) Patent No.: US 12,444,873 B2
(45) Date of Patent: Oct. 14, 2025

(54) CHARGING SOCKET WITH COMPACT AND SECURE PROTECTION FOR CONDUCTORS AGAINST FOREIGN OBJECTS

(71) Applicant: Amphenol PCD (Shenzhen) Co., Ltd., Shenzhen (CN)

(72) Inventor: Jing Yu, Shenzhen (CN)

(73) Assignee: Amphenol PCD (Shenzhen) Co., Ltd., Shenzhen (CN)

( * ) Notice: Subject to any disclaimer, the term of this patent is extended or adjusted under 35 U.S.C. 154(b) by 411 days.

(21) Appl. No.: 18/076,812

(22) Filed: Dec. 7, 2022

(65) Prior Publication Data

US 2024/0055793 A1 Feb. 15, 2024

(30) Foreign Application Priority Data

Aug. 11, 2022 (CN) ......................... 202210961143.3
Nov. 16, 2022 (CN) ......................... 202211459395.2

(51) Int. Cl.
*H01R 13/447* (2006.01)
*H01R 13/10* (2006.01)
*H01R 107/00* (2006.01)

(52) U.S. Cl.
CPC ........... *H01R 13/447* (2013.01); *H01R 13/10* (2013.01); *H01R 2107/00* (2013.01)

(58) Field of Classification Search
CPC .. H01R 13/447; H01R 13/4536; H01R 13/10; H01R 13/518

(Continued)

(56) References Cited

U.S. PATENT DOCUMENTS 10,266,059 B1 4/2019 Chang et al.
2016/0028169 A1 1/2016 Glick et al.
(Continued)

FOREIGN PATENT DOCUMENTS

EP 0232792 A1 8/1987
EP 2 685 568 A1 1/2014
WO 2014/001206 A1 1/2014

OTHER PUBLICATIONS

Seelig [WO 2014001206 A1] PE2E Machine Translation (Year: 2014).*

(Continued)

*Primary Examiner* — Tulsidas C Patel
*Assistant Examiner* — Thaslimur Rahman
(74) *Attorney, Agent, or Firm* — Wolf, Greenfield & Sacks, P.C.

(57) ABSTRACT

A socket with compact protection for conductors against foreign objects. The socket comprises a housing having channels extending in a mating direction, power conductors disposed in the channels, and assemblies disposed on the channels to block entrances into the channels. The assemblies are within a chamber of the housing surrounded by a wall. Each assembly comprises a cover and shutters pivotably coupled to the cover. Each shutter has a blocking portion and an actuating portion configured to be actuated by the housing of a desired plug. When the actuating portion is actuated, the blocking portion moves away from blocking the entrance to the channel. When a mating plug is removed and the actuating portion returns to its rest state, the blocking portion automatically moves back to block the entrance to the channel. Such a configuration reduces the risk of anything other than terminals of the desired plug contacting the conductors.

22 Claims, 18 Drawing Sheets

(58) Field of Classification Search
USPC .......................................... 439/131, 660, 585
See application file for complete search history.

(56) References Cited

U.S. PATENT DOCUMENTS

| | | | | |
|---|---|---|---|---|
| 2016/0118744 | A1* | 4/2016 | Wittrock | H01R 13/5227<br>439/190 |
| 2022/0371458 | A1* | 11/2022 | Park | H01R 13/44 |
| 2022/0376524 | A1* | 11/2022 | Xu | H01R 13/42 |

OTHER PUBLICATIONS

Mathey [EP 0232792 A1] PE2E Machine Translation (Year: 1987).*
Extended European Search Report dated Dec. 8, 2023 in connection with European Application No. 22211956.2.
[No Author Listed], International Standard. Plugs, socket-outlets, vehicle connectors and vehicle inlets—Conductive charging of electric vehicles—Part 1: General requirements. IEC 62196-1. Edition 4.0. May 2022. 196 pages.
[No Author Listed], International Standard. Plugs, socket-outlets, vehicle connectors and vehicle inlets—Conductive charging of electric vehicles—Part 2: Dimensional compatibility and interchangeability requirements for a.c. pin and contact-tube accessories. IEC 62196-2. Edition 2.0. Feb. 2016. 126 pages.

* cited by examiner

CHARGING SOCKET WITH COMPACT AND SECURE PROTECTION FOR CONDUCTORS AGAINST FOREIGN OBJECTS

RELATED APPLICATIONS

This application claims priority to and the benefit of Chinese Patent Application Serial No. 202210961143.3, filed Aug. 11, 2022, titled "CHARGING SOCKET." This application also claims priority to and the benefit of Chinese Patent Application Serial No. 202211459395.2, filed on Nov. 16, 2022, titled "SOCKET AND METHOD OF OPERATING THE SAME." The contents of these applications are incorporated herein by reference in their entirety.

FIELD

This patent application relates generally to interconnection systems, such as those including socket outlets, used to deliver energy.

BACKGROUND

Electric vehicles have become more and more popular. Generally, the vehicles are provided with a vehicle inlet, while charging stations are provided with a socket outlet. A cable may be used to connect the vehicle inlet and socket outlet. The cable may have a plug on one end for mating with the socket outlet and a connector on the other end for mating with the vehicle inlet.

Aspects of these interconnection components may be defined by industrial standards such as IEC 62196-1, IEC 62196-2. Some standards require that the conductors inside a socket are protected when the socket is not in use.

BRIEF SUMMARY

Aspects of the present disclosure relate to charging sockets with compact and secure contact protection.

Some embodiments relate to a socket. The socket may include a housing comprising a chamber surrounded by a wall; a plurality of conductive elements held by the housing and comprising mating ends extending in a mating direction; and a plurality of shutter assemblies disposed inside the chamber and each of the plurality of shutter assemblies comprising a movably mounted shutter configured to move into a first position in which the shutter blocks a first portion of the mating end of a respective conductive element of the plurality of conductive elements in the mating direction and a second position in which the shutter blocks a second portion, smaller than the first portion, of the mating end of the respective conductive element of the plurality of conductive elements in the mating direction.

In some embodiments, the housing may comprise a plurality of columns within the chamber and extending in the mating direction each of the plurality of columns comprising a channel extending therethrough; the plurality of conductive elements may be disposed in respective channels of the plurality of columns; and the plurality of shutter assemblies may be disposed at distal ends of columns of the housing.

In some embodiments, each shutter may comprise a first portion configured to block the mating end of a respective conductive element in the mating direction and a second portion coupled to the first portion and extending radially away from the respective conductive element.

In some embodiments, the plurality of columns each may comprise a flange extending into the channel and a ridge extending from an edge of the flange; and edges of the first portions may be disposed on the ridge.

In some embodiments, each shutter may comprise a shaft disposed between the first portion and second portion such that the first portion and second portion may be configured to rotate about the shaft.

In some embodiments, the plurality of columns may comprise recesses on side walls; and the plurality of shutter assemblies may comprise covers disposed into the recesses of the side walls of the respective columns of the housing.

In some embodiments, the covers of the shutter assemblies may extend beyond the respective columns in the mating direction and comprise openings extending therethrough; and the second portions of the shutters may extend through respective openings of the covers of respective shutter assemblies.

In some embodiments, the housing may include a front housing and a rear housing coupled to the front housing; and the plurality of conductive elements may comprise mounting ends opposite the mating ends; The mounting ends may extend into the rear housing.

In some embodiments, the plurality of conductive elements may be configured for delivering current up to 70 A; and the socket further may comprise a conductive element configured for ground and a pair of conductive elements configured for signals.

Some embodiments relate to a socket. The socket may include a conductive element comprising a mating end configured to receive a mating conductive element inserted along an axis of insertion; and a shutter subassembly comprising a cover comprising an aperture aligned, along the axis of insertion, with the mating end of the conductive element; and a plurality of shutters pivotably mounted to the cover and configured to pivot between at least a first state and a second state, wherein a larger portion of the aperture may be blocked by the plurality of shutters in the first state than in the second state.

In some embodiments, each of the plurality of shutters may be pivotably mounted to pivot around an axis perpendicular to the axis of insertion.

In some embodiments, each of the plurality of shutters may comprise a first portion and a second portion; when the shutter is in the first state, the first portion may be aligned, in a direction parallel to the axis of insertion with the mating end of the conductive element such that a first portion of the mating end of the conductive element may be blocked by the shutter and the second portion extends outside the cover at a first angle with respect to the axis of insertion; and when the shutter is in the second state, the first portion may be offset from the insertion axis such that the second portion of the mating end of the conductive element, smaller than the first portion, may be blocked by the shutter and the second portion extends outside the cover at a second angle with respect to the axis of insertion, smaller than the first angle.

In some embodiments, the first portions of the shutters may be disposed inside the cover; and the second portions of the shutters may extend outside through openings of the cover.

In some embodiments, the cover may comprise a plurality of projections disposed between adjacent openings; the plurality of projections may comprise recesses; and each shutter may comprise a shaft between the first portion and the second portion and having ends disposed in respective recesses of the projections such that the first portion may be rotatable about the shaft.

In some embodiments, each shutter may comprise a spring disposed around the shaft and having an extension abutting against the cover.

In some embodiments, for each shutter, the first portion extends in a first plane parallel to a second plane in which the second portion extends.

In some embodiments, each shutter may comprise a transition portion disposed between the first portion and the second portion and a shaft disposed between the first portion and the transition portion.

In some embodiments, the mating end of the conductive element may comprise a plurality of beams each comprising a contact portion curving towards the axis of insertion.

In some embodiments, the conductive element may comprise a shell comprising a plurality of tips curving towards ends of the beams.

In some embodiments, the plurality of beams may be a plurality of first beams; the conductive element may comprise a shell comprising a plurality of second beams; and each of the plurality of second beams may comprise a contact portion curving towards the contact portion of a respective one of the plurality of first beams.

Some embodiments relate to a method of operating a socket comprising a conductive element, at least a portion of the conductive element surrounding a space, and a shutter assembly comprising first portions blocking an entrance to the space and second portions extending from respective first portions and outside a perimeter of the conductive element. The method may include moving the second portions of the shutter assembly towards the perimeter of the conductive element, causing the first portions of the shutter assembly to unblock the entrance to the space.

In some embodiments, the method may include removing a force applied to move a second portion of the shutter assembly such that the second portion of the shutter assembly returns to a rest state, wherein returning to the rest state may comprise moving to at least partially block the entrance to the space.

Some embodiments relate to a socket. The socket may include a housing; a conductor arranged in the housing and configured to realize the conduction between a plug and an external power supply; and a rotatable member comprising a shaft, a blocking portion located on one side of the shaft and configured to block an opening of an end portion of the conductor, and an actuating portion located on the other side of the shaft, when the actuating portion is pressed, the blocking portion may swing away from the end opening of the conductor so as to be in an open state.

In some embodiments, there may be a plurality of the rotatable members, and the plurality of the rotatable members may be configured to control the closing and opening of the opening of the end portion of the same conductor, and the combined shape of the blocking portions of the plurality of the rotatable members may be the same as that of the shape of the opening at the end of the conductor.

In some embodiments, the rotatable member may be further provided with a lift portion extending upward, and both ends of the lift portion may be respectively connected with the shaft and the actuating portion so that the height of the actuating portion may be higher than that of the blocking portion.

In some embodiments, the socket may also include a cover for being sleeved on the outside of the conductor, the cover may be a hollow piece that penetrates up and down, an opening may be opened on the side wall of the cover, and the rotatable member may be pivotably arranged on the cover, the blocking portion may be located inside the cover, the actuating portion may extend from the opening to the outside of the cover, and the upper end surface of the actuating portion may abut against the upper edge of the opening.

In some embodiments, the inner wall of the cover may be provided with a recess adapted to the blocking portion.

In some embodiments, the rotatable member may be mounted on the cover or the housing through a torsion spring.

In some embodiments, a signal pin for communication may also be included, and the signal pin may be arranged in the housing.

In some embodiments, the housing may include an upper housing and a lower housing, the upper housing may be provided with a wrapping portion that wraps the side wall of the electrical conductor, the wrapping portion may be in the shape of a cylinder that penetrates up and down, and the electrical conductor may be arranged in the wrapping portion.

In some embodiments, the housing may include a front housing and a rear housing, the rear housing may be provided with a clamping part for installing and fixing the conductor, and the cross-section of the clamping part may be C-shaped.

In some embodiments, a mounting portion may be provided on the housing, the mounting portion may be arranged around the outer wall of the housing, and a plurality of mounting holes may be provided on the mounting portion.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
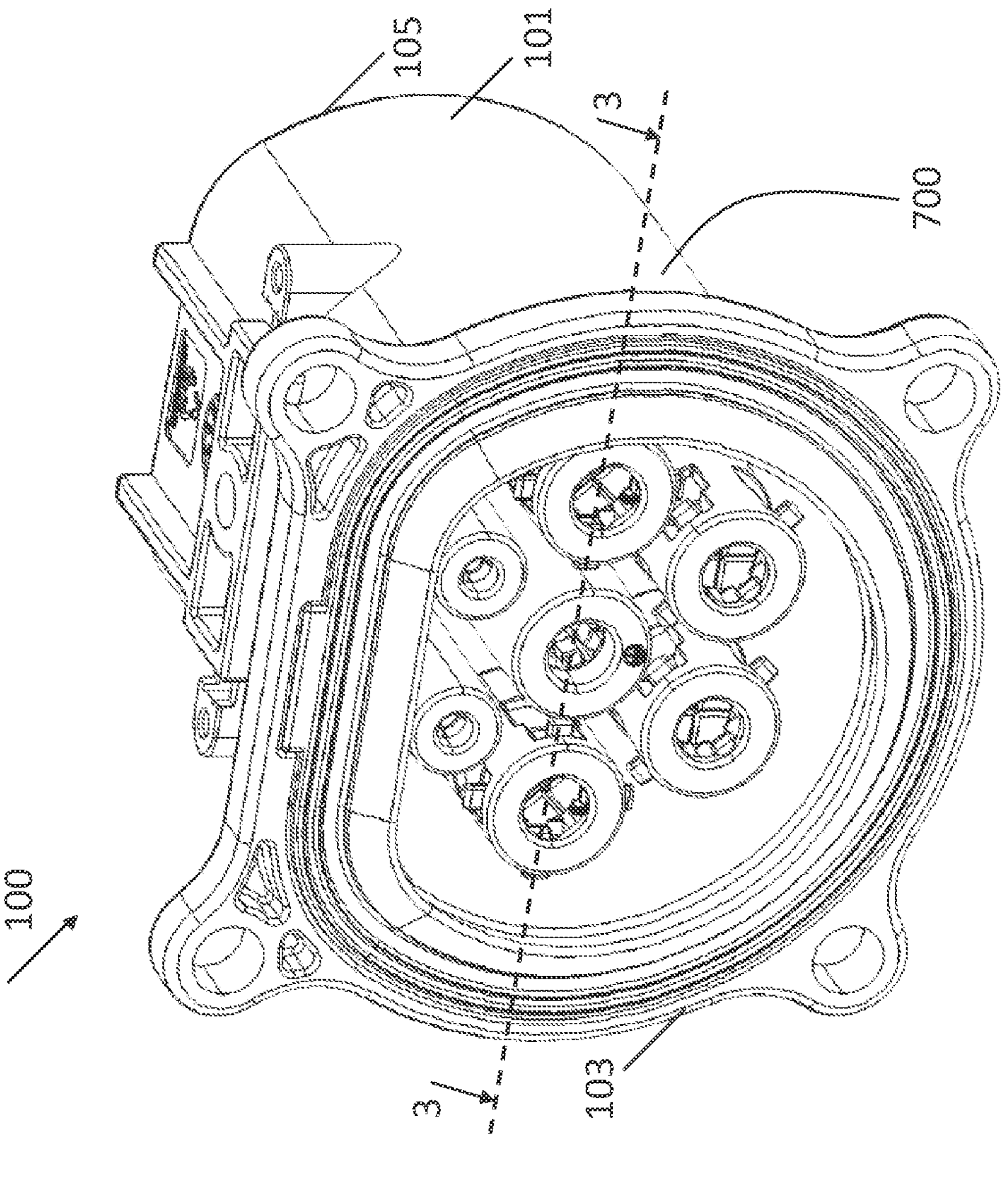
FIG. 1A is a front perspective view of a socket, according to some embodiments.
Figure 1B:
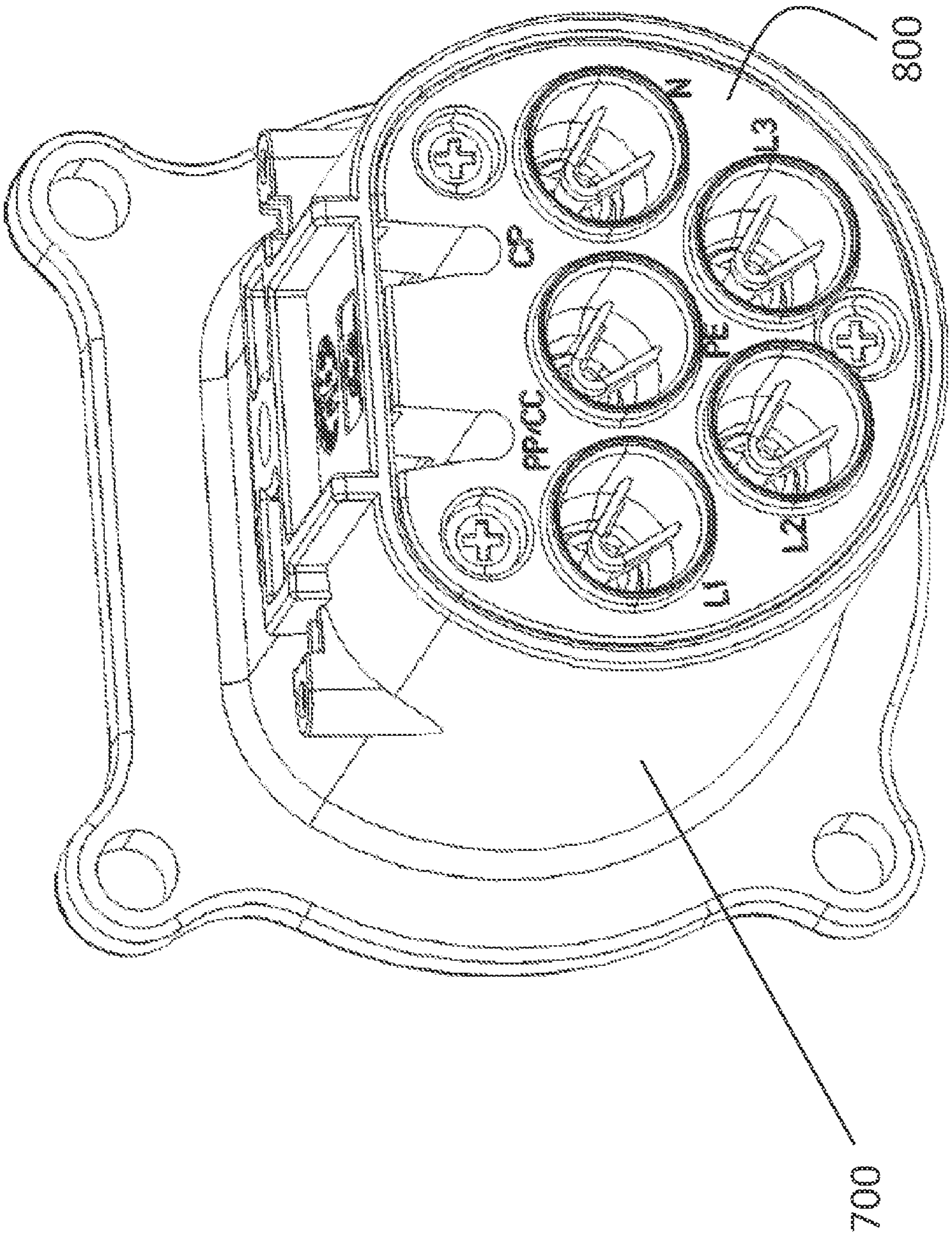
FIG. 1B is a rear perspective view of the socket of FIG. 1A.

The Inventors have recognized and appreciated design techniques that enable sockets to have compact and secure protection for conductive elements against foreign objects. The Inventors have recognized and appreciated that contact protection for conventional sockets may at least partially occupy areas outside a housing chamber and be accidentally triggered by foreign objects such as fingers. Aspects of the present disclosure enable sockets with compact and secure contact protection, which may reduce the risk of anything other than the plugs configured to mate with the socket contacting the sockets.

A socket may have a housing comprising a chamber surrounded by a wall, conductive elements held by the housing and comprising mating ends extending in a mating direction, and shutter assemblies configured to protect the conductive elements from contacting by foreign objects. Each shutter assembly may include a movably mounted shutter, configured to move into a first position in which the shutter blocks a first portion of the mating end of a respective conductive element in the mating direction and a second position in which the shutter blocks a second portion, smaller than the first portion, of the mating end of the respective conductive element in the mating direction.

Each shutter assembly may be disposed inside the chamber of a housing so as to reduce the chance of accidentally opening the shutter by a foreign object and simultaneously provide a more compact socket with protection against foreign objects.

Each shutter assembly may include multiple shutters for protecting a single conductive element. Such a configuration reduces the risk of the entrances to the mating ends from being accidentally opened by foreign objects. For example, even if one shutter is accidentally actuated by a foreign object such as a finger, the entrance to a respective mating end would not be opened unless all shutters for the entrance are actuated at the same time.

In some embodiments, a socket may have power conductors held by a housing. Each power conductor may have a mating end configured to mate with a complementary mating end of a plug and a mounting end configured to be coupled to a power component, such as a power source or a battery to be charged. The power conductors may be configured to deliver current up to 70 A such that the socket may deliver 70 A current with single-phase AC at 250V and deliver 63 A current with three phase AC at 480V. The housing may have a chamber surrounded by a wall, a base intersecting the wall, columns extending from the base and disposed inside the chamber, and channels extending through the columns and the base so as to hold respective power conductors while provide entrances to the mating ends and mounting ends.

The power conductors may have individual shutter assemblies configured to protect the power conductors from foreign objects. The shutter assemblies may be disposed within the chamber of the housing and on respective columns of the housing. The shutter assemblies may be configured to block the entrances to the mating ends in their rest states, unblock the entrances to the mating ends when actuated by a plug configured to mate with the socket, and automatically return to the rest states once the desired plug is removed. Such a configuration enables compact shutter assemblies to provide a higher level of contact security.

The shutter assemblies may be configured to be actuated only by portions of a plug such as housing portions holding the complementary mating conductive elements of the plug. Each shutter assembly may include a cover and shutters pivotably disposed in the cover. Each shutter may have a blocking portion at least partially blocking the entrance to a respective mating end and an actuating portion extending out of the cover and configured to be actuated by a complementary housing portion of the plug. The actuating portion may extend radially away from the respective mating end. When inserting the plug into the socket, the housing portions holding the complementary mating conductive elements of the plug may push respective actuating portions towards respective mating ends, which may cause the blocking portions move away from the entrances to the mating ends and therefore unblock the entrances; when removing the plug from the socket, the actuating portions may return to their rest states, which may cause the blocking portions to move back to block the entrances to the mating ends. Such a configuration reduces the risk of the entrances to the mating ends from being accidentally opened by foreign objects. For example, even if one shutter is accidentally actuated by a foreign object such as a finger, the entrance to a respective mating end would not be opened unless all shutters for the entrance are actuated at the same time.

The housing may be configured such that the shutters of the shutter assemblies may rotate about edges of the entrances to the mating ends. Each column of the housing may have a flange extending into the respective channel and a ridge extending from an edge of the flange. Edges of the blocking portions of the shutters of a respective shutter assembly may be disposed on the ridge such that the blocking portions may rotate about the ridge.

For each shutter, the blocking portion and actuating portion may extend in two different planes that are parallel to each other. The shutter may further include a shaft coupled to the blocking portion, a transition portion joining the shaft to the actuating portion. The shaft is disposed in a respective cover such that the blocking portion and actuating portion may rotate about the shaft.

The power conductors may be configured to be capable of sustaining a higher mating force needed to actuate the shutter assemblies. Each power conductor may include an inner terminal and an outer shell. The inner terminal may include beams each having a mating contact portion curving inside, the mounting end, and an intermediate portion joining the beams and the mounting end. The shell may include tips curving inside and towards ends of the beams of the inner terminal such that the tips may guide a mating terminal of the plug into the mating position. The outer shell may have beams curving towards the mating contact portions of the beams of the inner terminal so as to provide desired mating force between the power conductor and the mating terminal of the plug. The shell may have flaps extending outside and into recesses of side walls of the columns of the housing and abutting a rear housing inserted into the housing so as to reduce the risk of the power conductor from being moved in the mating direction by the mating force.

Techniques described herein may be integrated in any suitable combination including, for example, embodiments described below. Sockets may be configured to comply with industry standards. For example, and not by way of limitation, the embodiments described below may apply these techniques in sockets satisfying the requirements of the IEC 62196-2 specification.

Figure 2:
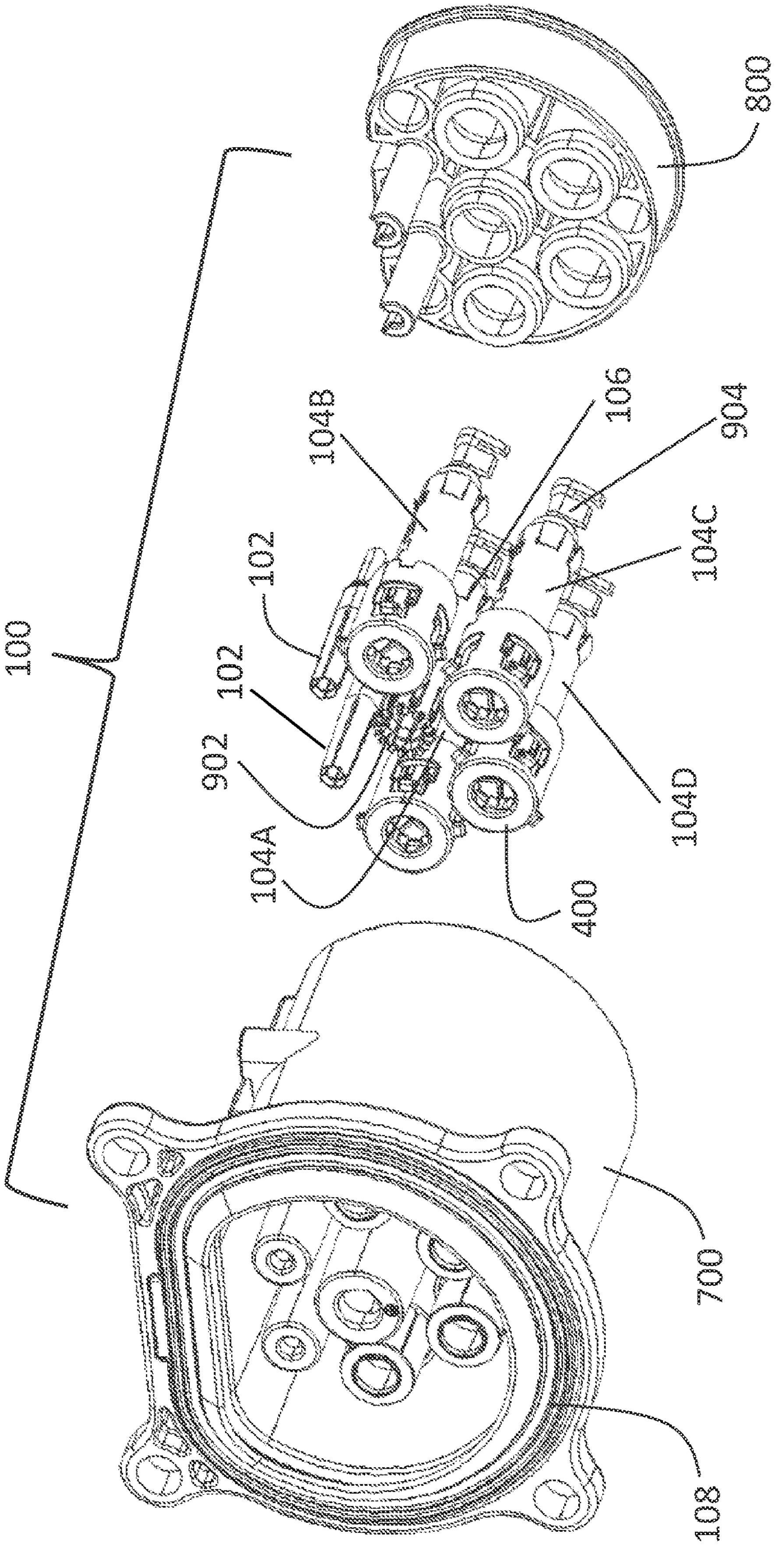
FIG. 2 is a partially exploded perspective view of the socket of FIG. 1A.
Figure 3:
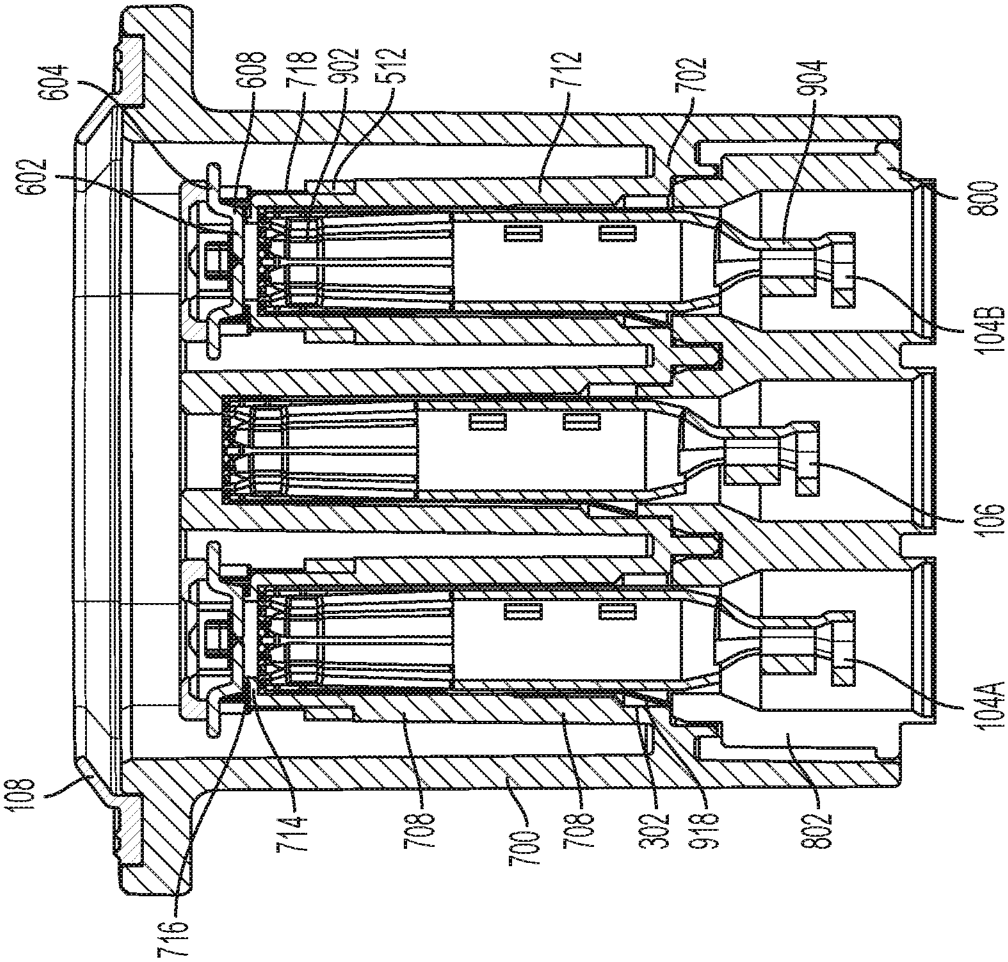
FIG. 3 is a cross-sectional perspective view of the socket of FIG. 1A along a line marked "3-3" in FIG. 1A.

According to a first embodiment illustrated in FIGS. 1A-10, a socket 100 may include a housing 101, a pair of signal conductors 102, a ground conductor 106, power conductors 104A-D, and shutter assemblies 400 configured to protect the power conductors 104A-D. The conductors (e.g., 102, 104A-D, 106) may be held in the housing 101, with mating ends 902 accessible through a front end 103 of the housing and mounting ends 904 accessible through a rear end 105 of the housing. As shown in FIGS. 2 and 3, the shutter assemblies 400 may block the entrances to the mating ends 902 of the power conductors 104A-D when the shutter assemblies 400 are in their rest states.

Figure 7A:
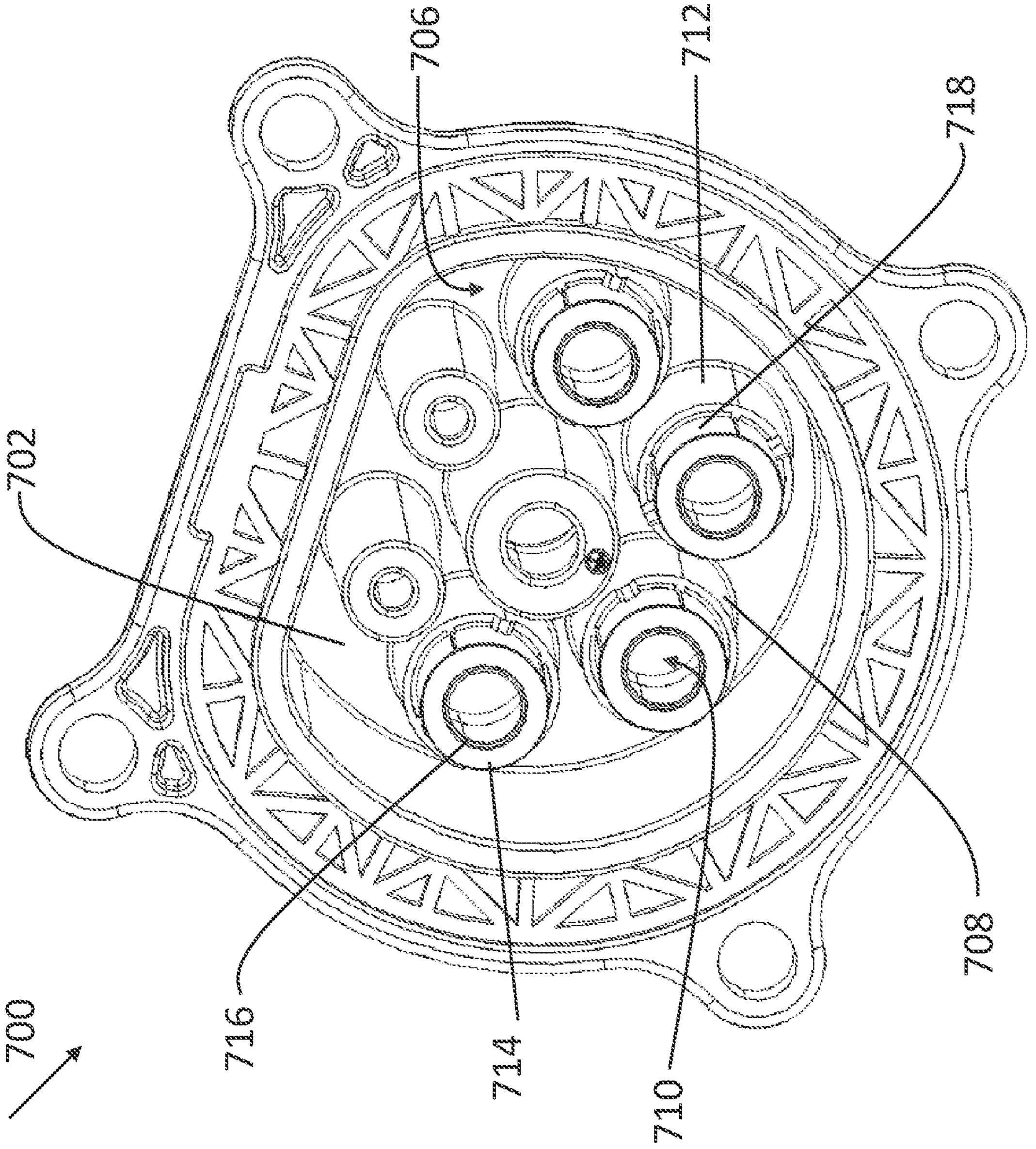
FIG. 7A is a front perspective view of a front housing of the socket of FIG. 1A, with a seal hidden.
Figure 7B:
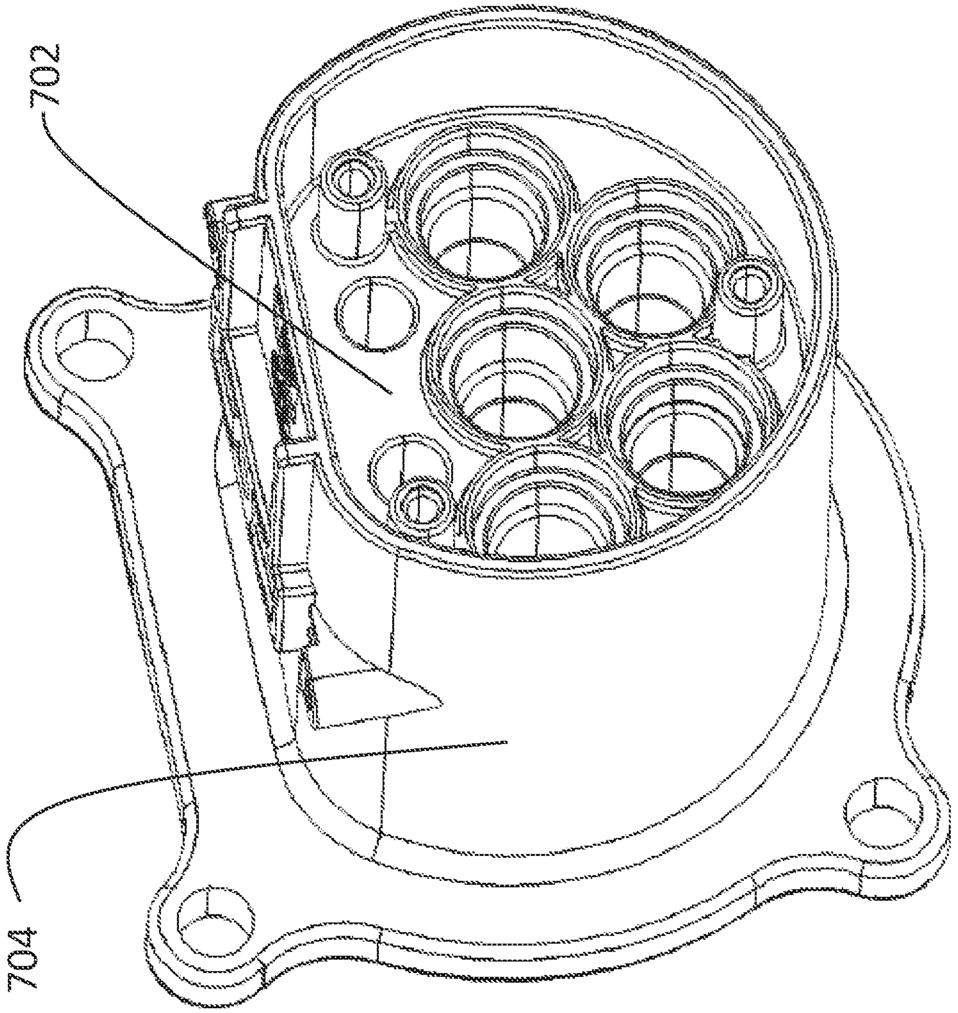
FIG. 7B is a rear, side perspective view of the front housing of FIG. 7A.

The housing may include a front housing 700 and a rear housing 800 coupled to the front housing 700. In some embodiments, for example, the rear housing 800 is at least partially inserted into the front housing 700. In other embodiments, the front housing 700 and the rear housing 800 are a unitary housing. The front housing 700 may include a seal 108 at the front end 103. The seal 108 may be configured to mate with a mating plug for a secure mating (for example, the seal 108 may encircle or enclose a perimeter of a mating plug for a secure mating). FIG. 7A is a front perspective view of the front housing 700, with the seal 108 hidden. FIG. 7B is a rear, side perspective view of the front housing 700. As shown in FIGS. 7A and 7B, the front housing 700 may include a base 702, a wall 704 extending from the base 702, a chamber 706 surrounded by the wall 704, and columns 708 extending from the base 702. Each column 708 may include a channel 710 extending at least partially therethrough. Each channel 710 may receive a respective conductor (e.g., 104A-D, 106). The column 708 configured for receiving the ground conductor 106 may extend beyond the columns 708 configured for receiving the power conductors 104A-D such that the ground conductor 106 may meet a mating plug pin before the power conductors 104A-D meet their respective mating plug pins (see, e.g., FIGS. 3, 10B).

Figure 8A:
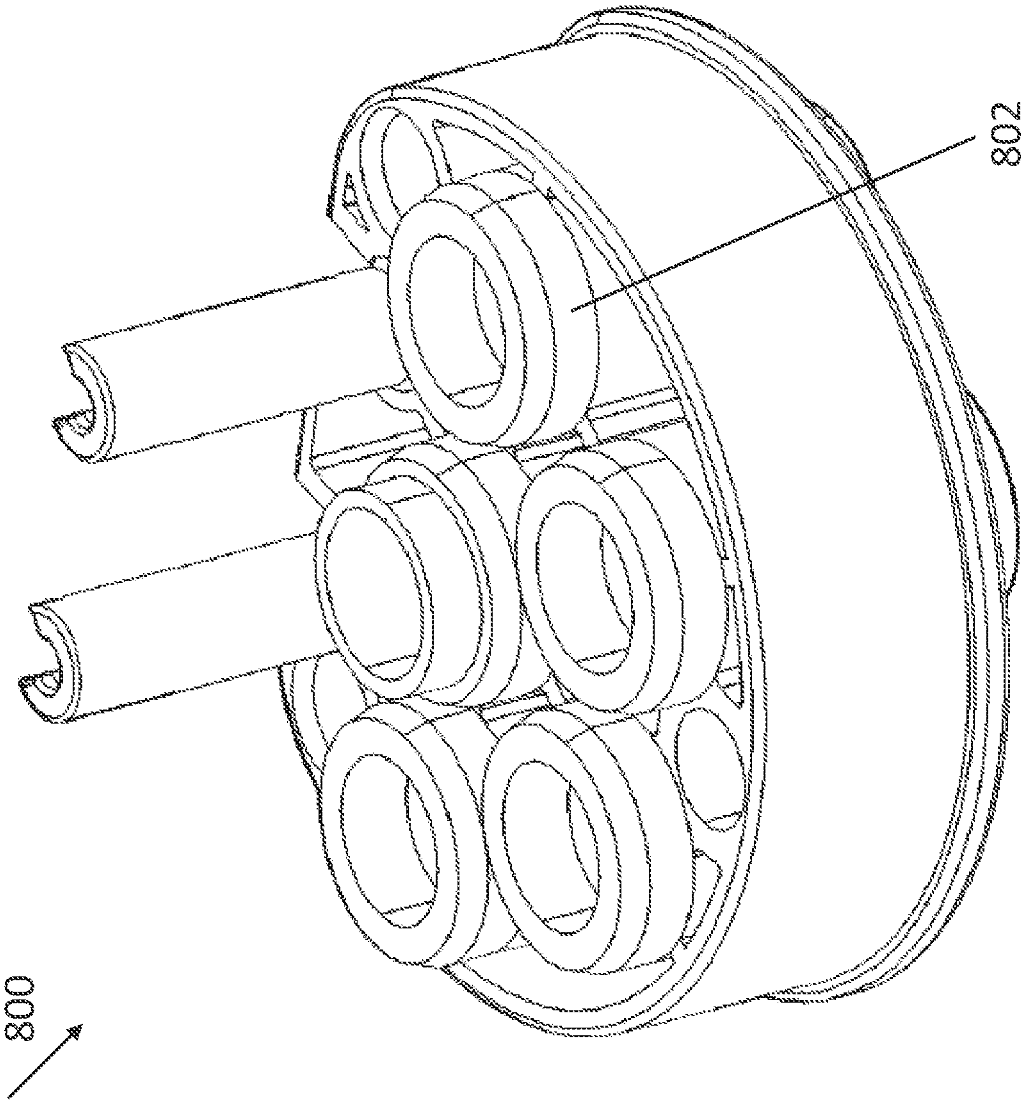
FIG. 8A is a front, side perspective view of a rear housing of the socket of FIG. 1A.
Figure 8B:
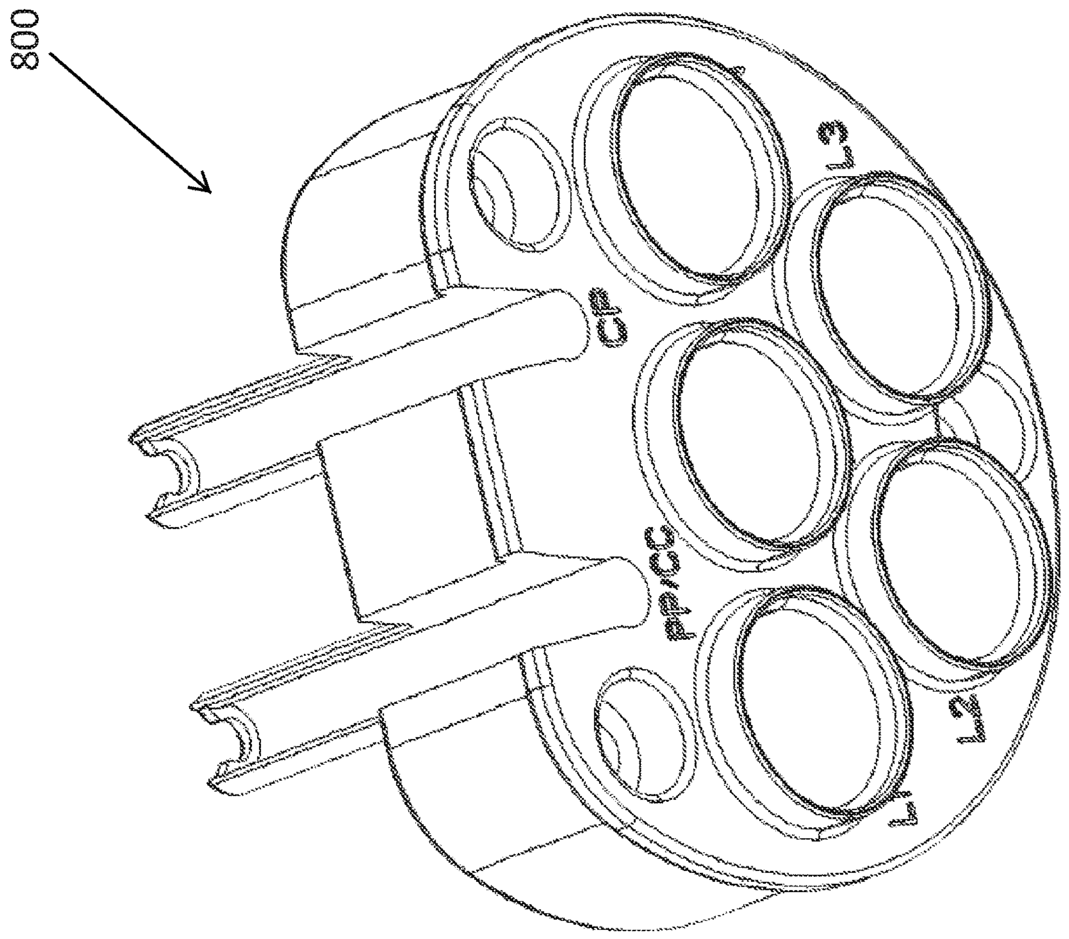
FIG. 8B is a rear, side perspective view of the rear housing of FIG. 8A.

FIG. 8A is a front, side perspective view of the rear housing 800. FIG. 8B is a rear, side perspective view of the rear housing 800. As shown in FIGS. 8A and 8B, the rear housing 800 may have columns 802 configured to mate with respective columns 708 of the front housing (see, e.g., FIG. 3). The column 802 configured for the ground conductor 106 may be correspondingly configured to provide support to the ground conductor 106 such that the ground conductors 106 meets a mating plug pin before the power conductors 104A-D meet their respective mating plug pins.

Referring to FIGS. 7A and 7B, the columns 708 configured for receiving the power conductors 104A-D each may include a flange 714 extending into the respective channel 710 and a ridge 716 extending from an edge of the flange 714. The columns 708 configured for receiving the power conductors 104A-D each may also include a side wall 712 that has a recess 718 adjacent the front end.

Figure 4A:
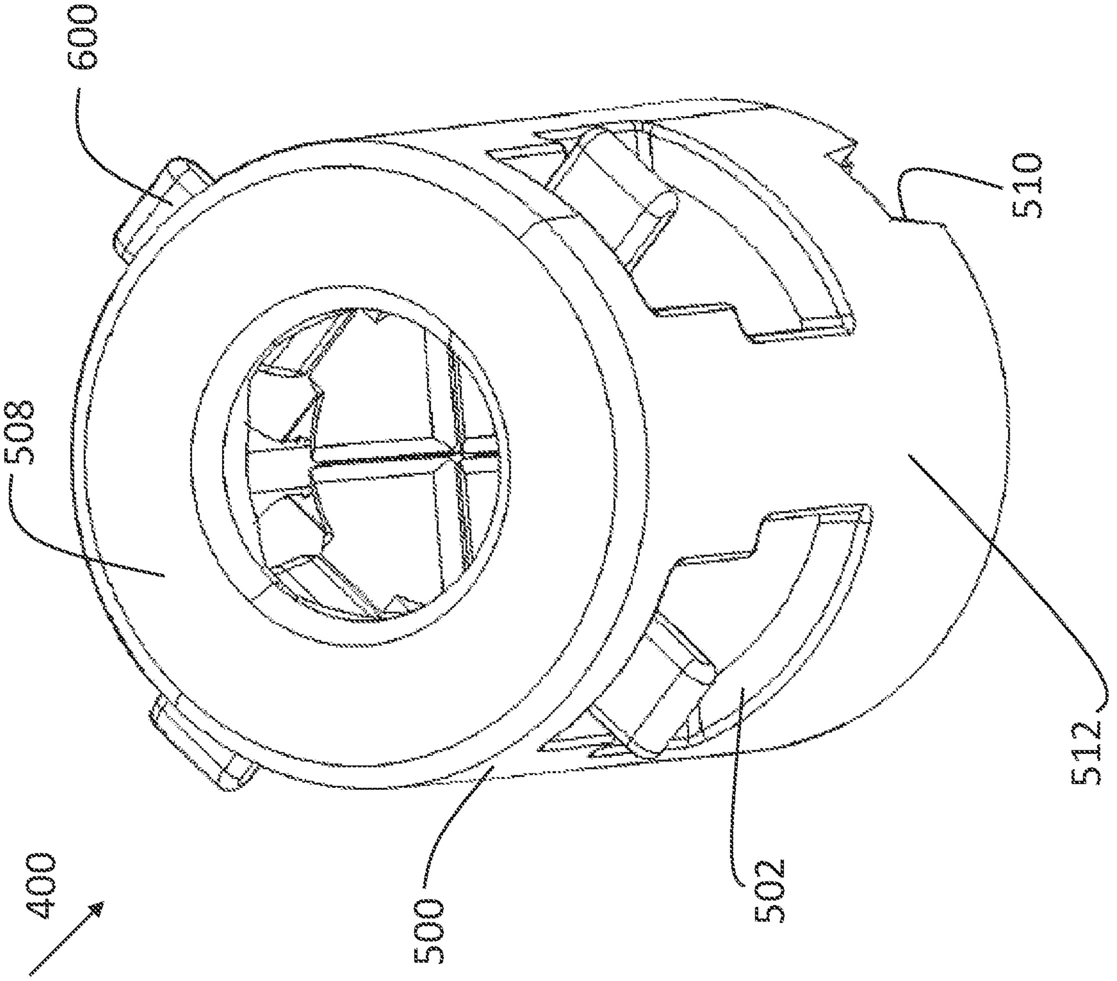
FIG. 4A is a front, side perspective view of a shutter assembly of the socket of FIG. 1A.
Figure 4B:
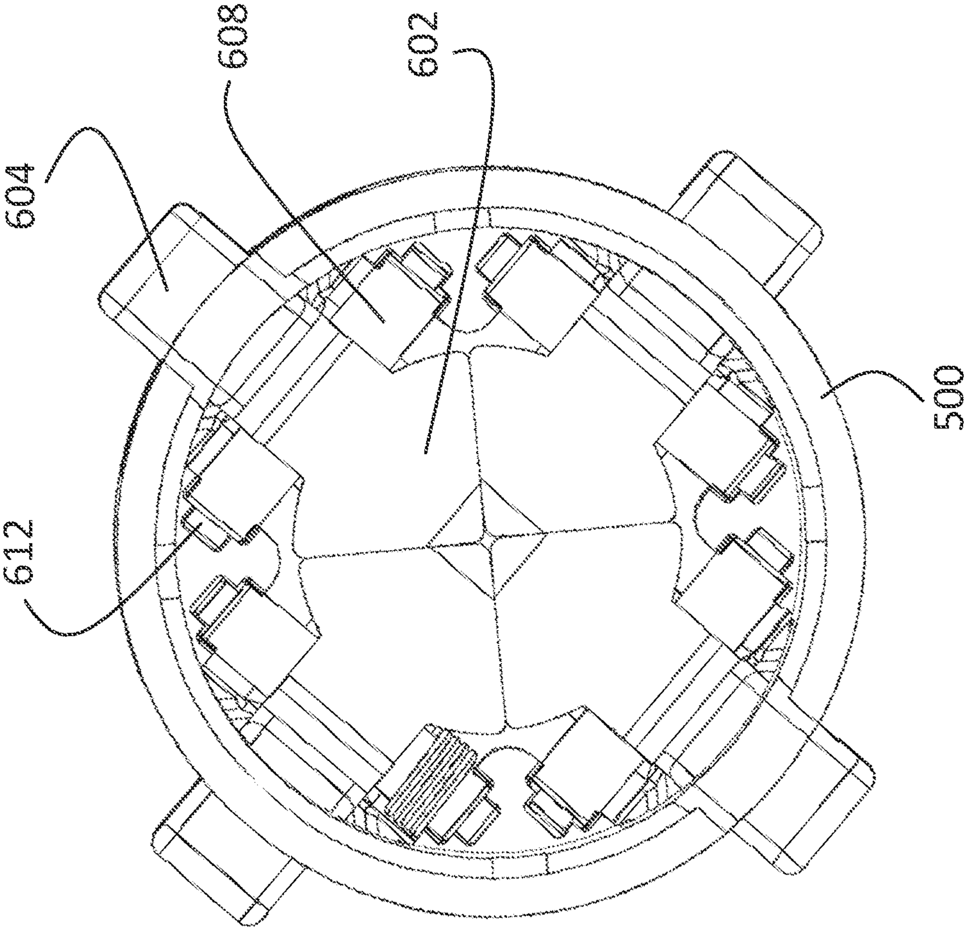
FIG. 4B is a rear perspective view of the shutter assembly of FIG. 4A.
Figure 5:
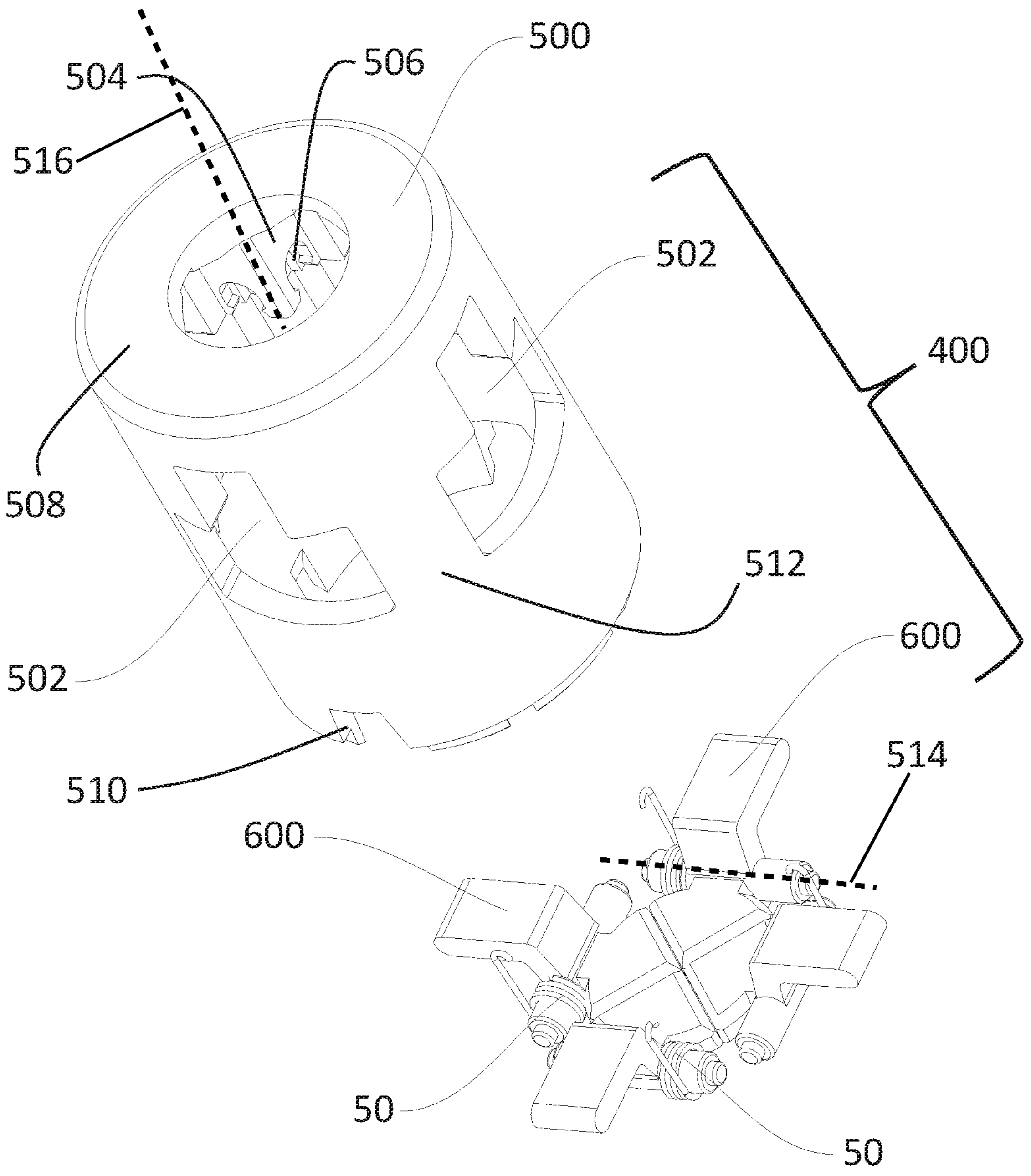
FIG. 5 is a partially exploded view of the shutter assembly of FIG. 4A.
Figure 6:
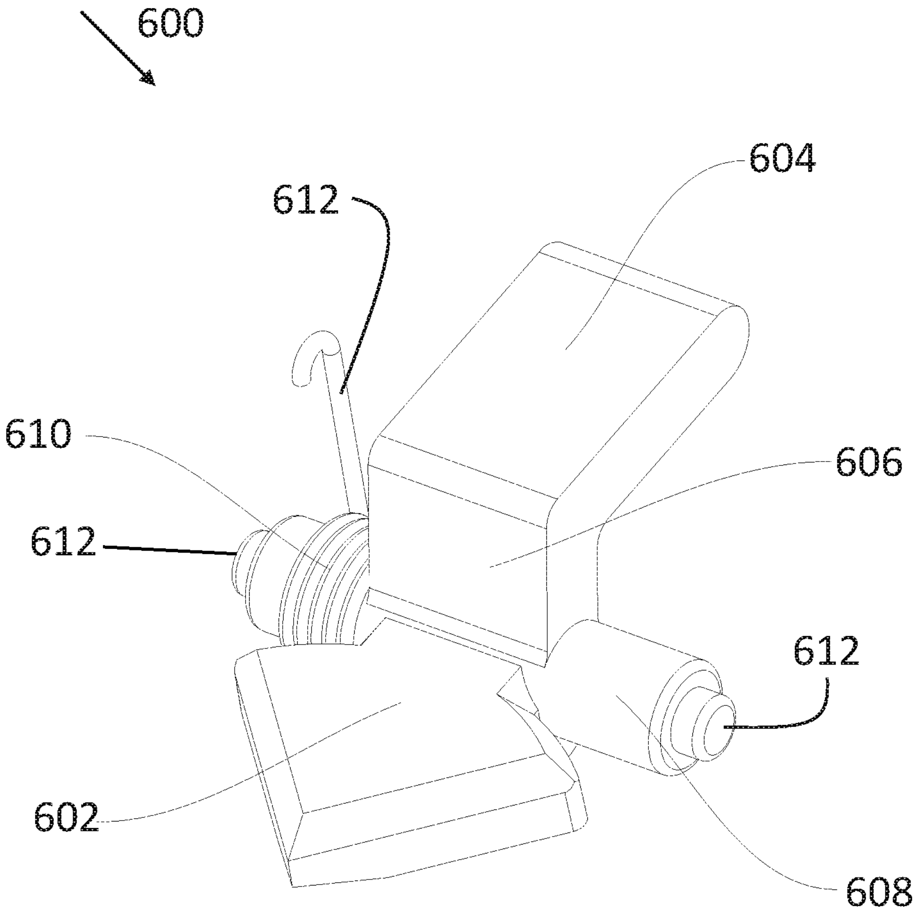
FIG. 6 is a perspective view of a shutter of the shutter assembly of FIG. 4A.

The shutter assemblies 400 may be disposed on the columns 708 configured for receiving the power conductors 104A-D so as to block the entrances to the mating ends 902 of the power conductors 104A-D. In some embodiments, shutter assemblies 400 may be disposed at distal ends (e.g., 718) of columns 708 of the housing. FIG. 4A is a front, side perspective view of a shutter assembly 400. FIG. 4B is a rear perspective view of the shutter assembly 400. FIG. 5 is a partially exploded view of the shutter assembly 400. FIG. 6 is a perspective view of a shutter 600 of the shutter assembly 400.

As shown in FIGS. 4A-6, a shutter assembly 400 may include a cover 500 and at least one shutter 600 movably coupled to the cover 500. For example, in some embodiments, at least one shutter 600 is at least partially disposed in the cover 500. In some embodiments, at least one shutter 600 is pivotably coupled to the cover 500. The cover 500 may include a side wall 512 configured to fit in the recess 718 of the side wall 712 of the column 708 (see, e.g., FIG. 3). The side wall 512 may have gaps 510 configured to mate with matching features of the column 708 so as to ensure the shutter assembly 400 to be disposed in a desired orientation on the column 708. The cover 500 may have a flange 508 extending from the side wall 512 and the flange 508 may be flush with a flange of the column 708 configured for receiving the ground conductor 106 (see, e.g., FIG. 3). The cover 500 may further have openings 502 extending through the side wall 512, and corners 504 disposed between adjacent openings 502 and having recesses 506 such that the shutters 600 may be disposed between the corners 504 and have actuating portions 604 extending radially out of the cover 500 through the openings 502. Having the actuating portions 604 extending out of the openings 502 may restrain the actuating portions 604 from rotating inwardly and therefore reduce the risk of a foreign object pushing through blocking portions 602.

For each shutter assembly 400, there may be multiple shutters 600 pivotably disposed in the cover 500 so that the entrance to a respective mating end 902 is not opened unless the shutters 600 are actuated at the same time. Each shutter 600 may include a blocking portion 602 disposed inside the cover 500 so as to at least partially block the entrance to the respective mating end 902 and the actuating portion 604 extending out of the cover 500 through the openings 502 so as to be accessible by a mating plug. The blocking portion 602 and the actuating portion 604 may extend in two different planes that are parallel to each other. Edges of the blocking portions 602 may be disposed on the ridge 716 of a respective column 708 such that the blocking portions 602 may rotate about the ridge 716 (see, e.g., FIG. 3).

Each shutter 600 may further include a transition portion 606 disposed between the blocking portion 602 and the actuating portion 604 and a shaft 608 disposed between the blocking portion 602 and the transition portion 606. The shaft 608 may have end portions 612 configured to be pivotably disposed in the recesses 506 of the corners 504 of the cover 500. There may be a spring 610 wound about a portion of the shaft 608 and having an extension 612 configured to abut the cover 500 so as to facilitate the rotation of the shutter 600 about the shaft 608. As shown in FIG. 5, the shaft 608 may extend along an axis 514 perpendicular to an axis 516 of insertion.

Figure 10A:
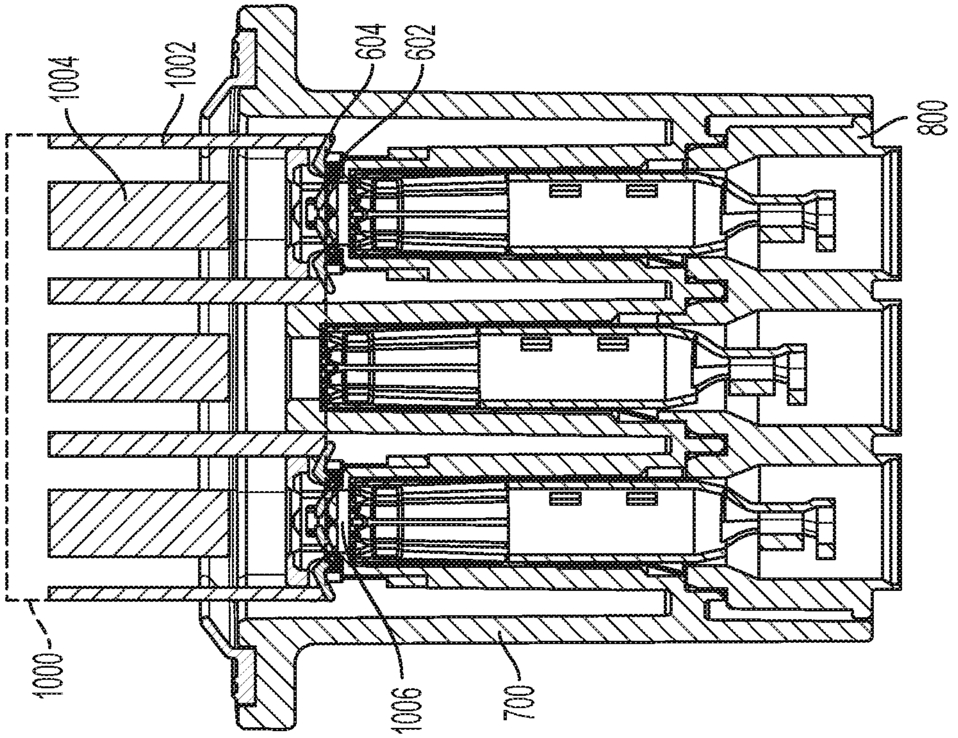
FIG. 10A is a cross-sectional perspective view of the socket of FIG. 3, illustrating shutters partially opened by a plug, according to some embodiments.
Figure 10B:
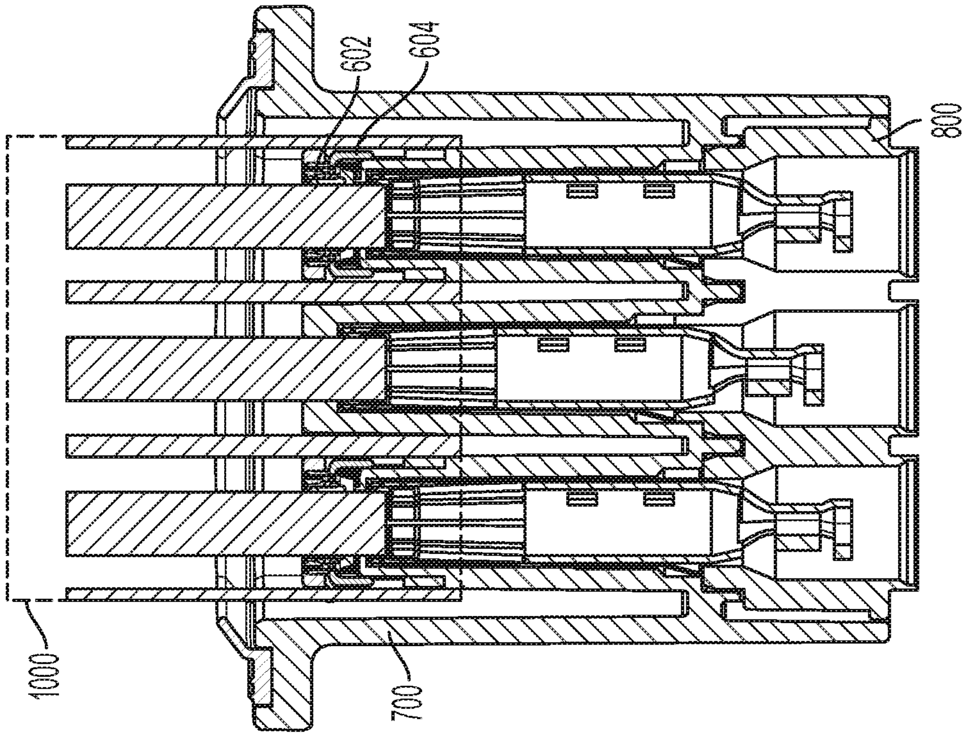
FIG. 10B is a cross-sectional perspective view of the socket of FIG. 3, illustrating shutters fully opened by a plug, according to some embodiments.

Referring to FIG. 5 and FIG. 10B, when the shutter 600 is in a first state, the blocking portion 602 may be aligned, in a direction parallel to the axis 516 of insertion with the mating end of a respective power conductor (e.g., 104A-D) such that a first portion of the mating end of the respective power conductor (e.g., 104A-D) may be blocked by the blocking portion 602 and the actuating portion 604 may extend outside the cover at a first angle with respect to the axis 516 of insertion. Referring to FIG. 5 and FIG. 10A, when the shutter is in a second state, the blocking portion 602 may be offset from the axis 516 of insertion such that a second portion of the mating end of the respective power conductor (e.g., 104A-D), smaller than the first portion, may be blocked by the blocking portion 602 and the actuating portion 604 may extend outside the cover at a second angle with respect to the axis 516 of insertion.

The shutter assemblies 400 may be configured to be actuated by a mating plug. FIG. 10A is a cross-sectional perspective view of the socket 100, illustrating shutters 600 partially opened by a plug 1000. FIG. 10B is a cross-sectional perspective view of the socket 100, illustrating shutters 600 fully opened by the plug 1000. As shown in FIGS. 10A and 10B, when inserting the plug 1000 into the socket 100, the plug housing 1002 may meet the actuating portions 604 of the shutter assemblies 400 before the plug pins 1004 reach the entrances to the mating ends 902. The plug housing 1002 may make the actuating portions 604 rotate about respective shafts 608 and therefore towards perimeters of respective power conductors. Accordingly, the respective blocking portions 602 may rotate about the respective shafts 608 and therefore move away from the entrances 1006 to the mating ends 902 such that the plug pins 1004 may be inserted into the power conductors 104A-D. When the plug 1000 is removed and therefore the plug housing 1002 is no longer contacting or pushing the actuating portions 604, the shutter assemblies 400 may automatically return to their rest states (see, e.g., FIG. 3) due to, for example, the spring 610. In some embodiments, the blocking portion 602 may be configured larger and/or heavier than that of the actuating portion 604 so as to at least partially enable the shutter assemblies 400 to automatically return to their rest states. Such a configuration reduces the risk of the entrances to the mating ends from being accidentally opened by foreign objects. For example, even if one shutter is accidentally actuated by a foreign object such as a finger, the entrance to a respective mating end would not be opened unless all shutters for the entrance are actuated at the same time.

A shutter 600 may be configured to move into a first position, as shown in FIG. 10A, in which the shutter 600 blocks a first portion of the mating end of the power conductor (e.g., 104A-D) in the mating direction and a second position, as shown in FIG. 10B, in which the shutter 600 blocks a second portion, smaller than the first portion, of the mating end of the power conductor (e.g., 104A-D) in the mating direction.

The plug may generate a larger mating force to actuate the shutter assembly 400. The conductors 104A-D may be configured to be capable of sustaining this higher mating force. The ground conductor 106 may be configured similar to the power conductors 104A-D. For example, as described with respect to FIG. 9A-9B herein, the ground conductor 106 may have a same structure as the power conductors 104A-D.

Figure 9A:
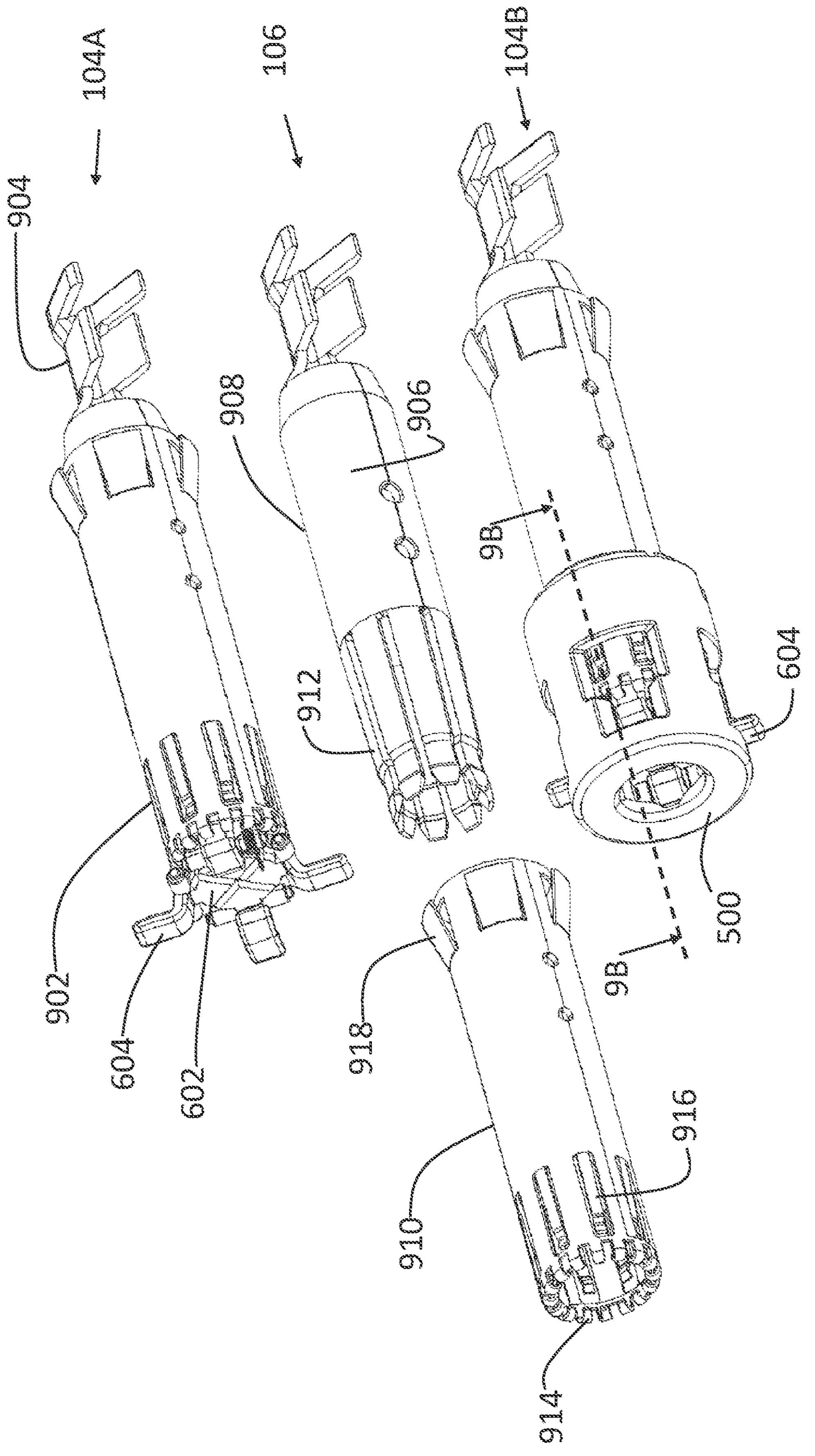
FIG. 9A is a perspective view of a row of conductors of the socket of FIG. 1A, with a cover of the shutter assembly of FIG. 4A hidden and a conductor exploded.
Figure 9B:
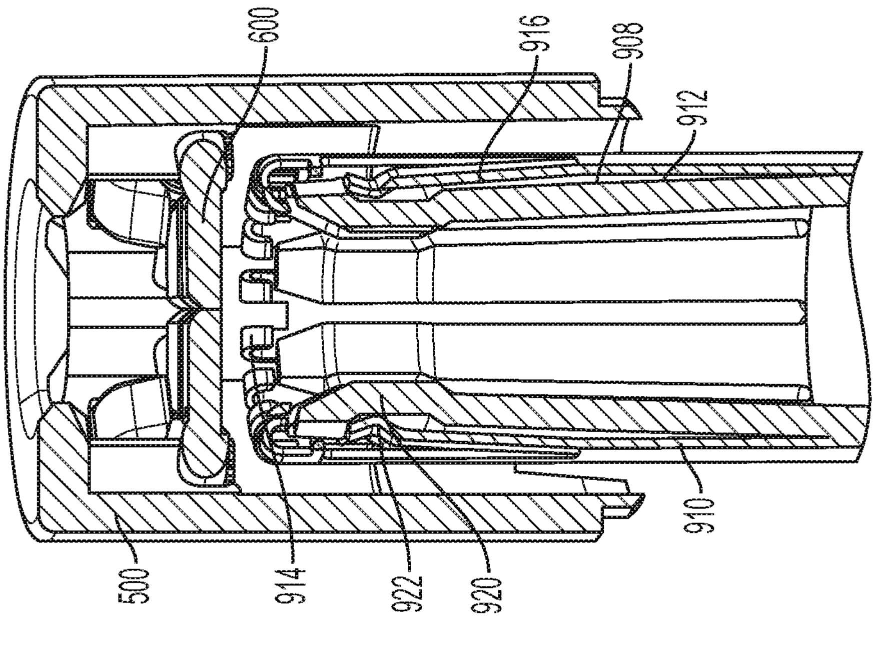
FIG. 9B is a partial cross-sectional perspective view of a conductor with its shutter assembly along the line marked "9B-9B" in FIG. 9A.

FIG. 9A is a perspective view of conductors 104A, 104B, and 106 of the socket 100, with the cover 500 of the shutter assembly 400 for power conductor 104A hidden and the ground conductor 106 exploded. FIG. 9B is a partial cross-sectional perspective view of the conductor 104B with its shutter assembly 400 along the line marked "9B-9B" in FIG. 9A.

As shown in FIGS. 9A and 9B, each power conductor may include a terminal 908 and a shell 910 disposed outside the terminal 908. The terminal 908 may include beams 912 each having a mating contact portion 922 curving inside, the mounting end 904, and an intermediate portion 906 joining the beams 912 and the mounting end 904. The shell 910 may include tips 914 curving inside and towards ends of the beams 912 of the terminal 908 such that the tips 914 may guide a mating plug pin into the mating position. The shell 910 may have beams 916 curving towards the mating contact portions 922 of the beams 912 of the terminal 908 so as to provide desired mating force between the power conductor and the mating plug pin. The shell 910 may have flaps 918 extending outside and into recesses 302 of the side walls 712 of the columns 708 of the front housing 700 and abutting the columns 802 of the rear housing 800 inserted into the front housing 700 so as to reduce the risk of the power conductor being moved in the mating direction by the mating force (see, e.g., FIG. 3). In some embodiments, the shell may be integrated with the housing 101.

Figure 11:
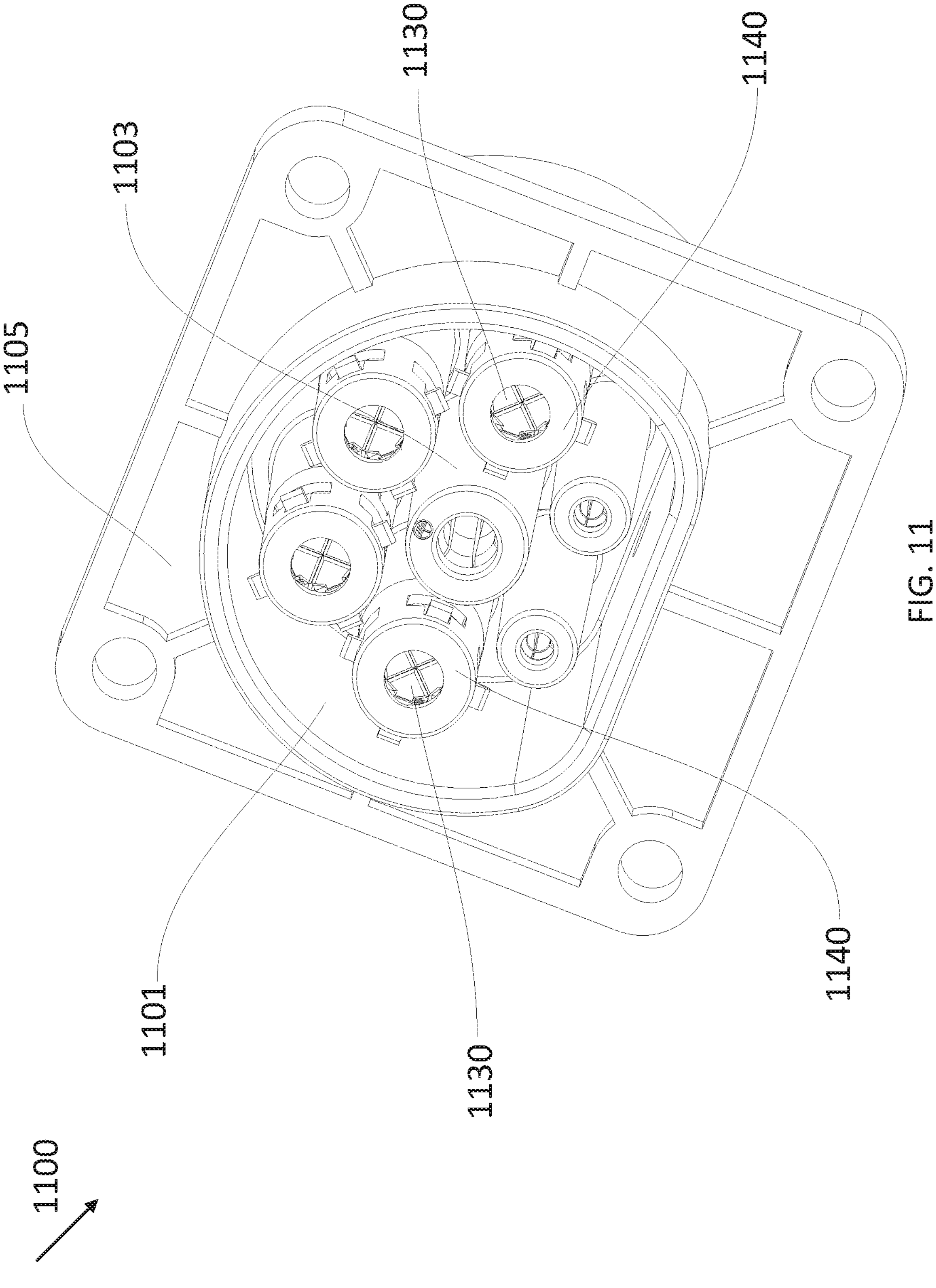
FIG. 11 is a front perspective view of a socket, according to some embodiments.
Figure 12:
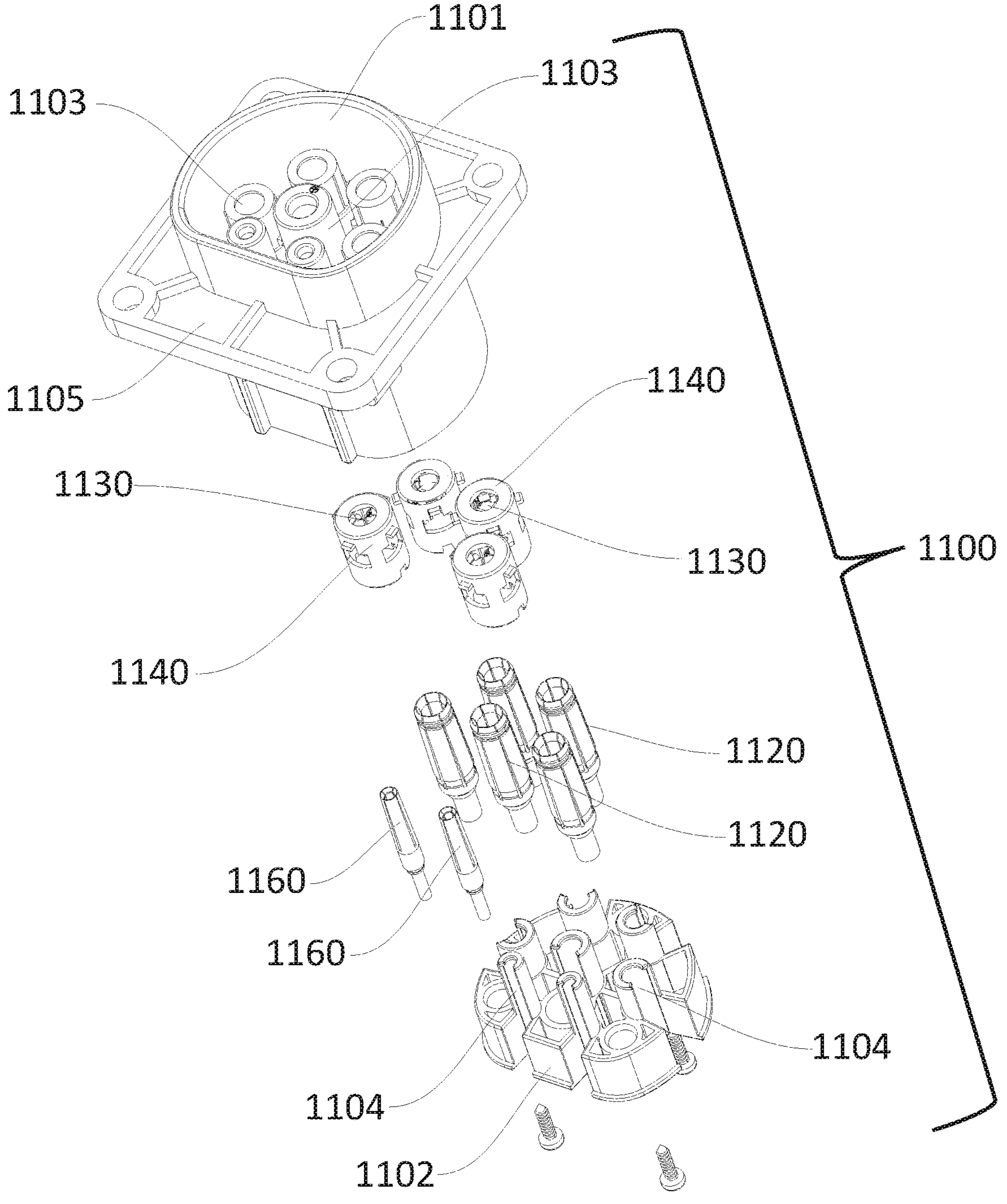
FIG. 12 is a partially exploded perspective view of the socket of FIG. 11.

According to a second embodiment illustrated in FIGS. 11-12, a socket 1100 may include a housing, conductors 1120 disposed in the housing configured to realize the conduction between a plug and an external power source, rotatable members 1130, and covers 1140. The rotatable member 1130 may be configured similar to shutters 600. The covers 1140 may be configured similar to covers 500.

The rotatable member 1130 may include a shaft, a blocking portion located on one side of the shaft and configured to close the end opening of the conductor 1120, and an actuating portion located on the other side of the shaft. When the actuating portion is pressed, the blocking portion can swing away from the end opening of the conductor 1120 to be in an open state. When this solution is not in use, the blocking portion of the rotatable member may block the end opening of the conductor 1120 so as to protect the conductor 1120 in the housing, and when a plug is inserted, the housing of the plug may first come into contact with the actuating portion of the rotatable member, and the actuating portion may be pushed during the insertion process so that the blocking portion may swing away from the end opening of the conductor 1120 so that it is in an open state, and finally the plug may be connected to the conductor 1120 for charging. Through the above arrangement, the electrical conductor 1120 may be protected when the plug socket is not in use, thereby reducing the risk of other foreign objects from contacting the electrical conductor 1120 of the socket, avoiding accidental electric shock when socket is connected to the power supply, and ensuring the security of the charging socket so as to improve user safety.

In some embodiments, the area and weight of the blocking portion may be set larger than that of the actuating portion such that reset is realized by the volume weight of the blocking portion, and the end opening of the conductor 1120 can close automatically when the plug is removed. Additionally or alternatively, a spring, which may be configured similar to spring 610, may at least partially configured such that the end opening of the conductor 1120 can close automatically when the plug is removed.

As shown in FIGS. 11 to 12, there may be multiple rotatable members 1130, and the multiple rotatable members 1130 may be configured to control the closing and opening of the opening at the end of a same conductor 1120. The enclosed shape of the blocking portions of the rotatable members may be adapted to the shape of the opening at the end of the conductor 1120. Through the above arrangement, the plurality of rotatable members 1130 may control the closing and opening of the opening at the end of the same conductor 1120 at the same time. When the blocking portion swings upward away from the end opening of the conductor 1120, it may interact with the plug and affects the charging effect of the plug. This structure arrangement reduces the difficulty of swinging the blocking portions, and also ensures a stable connection between the plug and the conductor 1120 and improves the operation stability of the socket.

The rotatable member 1130 may be further provided with a lifting portion extending upward, and both ends of the lifting portion may be respectively connected to a shaft and the actuating portion such that the actuating portion may be disposed higher than the blocking portion in the mating direction. Through the above arrangement, the actuating portion may be further away from the end opening of the conductor 1120 so that when the plug is inserted into the socket, the plug abuts the actuating portion so that the blocking portion swings and lifts up.

The rotatable member 1130 may be further provided with a cover 1140 that may be sleeved on the outside of the conductor 1120. The cover 1140 may be a hollow member that penetrates up and down. An opening may be opened on the wall, the rotatable member 1130 may be pivotably disposed on the cover 1140 the blocking portion may be located inside the cover 1140, and the actuating portion may extend from the opening to the outside of the cover 1140, the upper end surface of the actuating portion may be in contact with the upper edge of the opening. By the arrangement of the cover 1140, wrapping protection can be formed on the side wall of the conductor 1120 to reduce the risk of other foreign objects contacting the conductor 1120, thereby affecting the electrical safety of the plug socket. At the same time, arranging the rotatable member 1130 on the cover 1140 can form a complete control structure with the rotatable member 1130 and the cover 1140, thereby better controlling the conduction and closing of the conductor 1120 and ensuring charging safety.

The inner wall of the cover may be provided with a groove adapted to the blocking portion. Through the arrangement of the groove, when the plug abuts against the actuating portion and makes the rotatable member 1130 swing, the blocking portion may swing up and move into the groove, thereby reducing the risk of the blocking portion interfering with the plug.

The rotatable member 1130 may be mounted on the cover 1140 or the housing through a torsion spring. Through the arrangement of the torsion spring, the elastic force of the torsion spring may be used as the elastic force for the resetting of the blocking portion, thereby ensuring that when the plug is withdrawn from the socket, the rotatable member 1130 can return to its rest state. The blocking portion may close the opening at the end of the conductor to ensure that the conductor 1120 is in a closed state when the socket is not in use, thereby improving user safety.

As shown in FIG. 12, a signal pin 1160 for communication may be further included, and the signal pin 1160 may be arranged in the housing. Through the setting of the signal pin 1160, after the plug is inserted into the socket, the signal communication between the two may be carried out through the signal pin 1160, so as to ensure that the plug and the socket are mated with each other.

The housing may include a front housing 1101 and a rear housing 1102, and the front housing 1101 may be provided with a wrapping portion 1103 that wraps the side wall of the conductor 1120. The wrapping portion 1103 may be in the shape of a cylinder that penetrates up and down, and the conductor 1120 may be held in the wrapping portion 1103. Through the above arrangement, the housing may be divided into the front housing 1101 and the rear housing 1102, thereby enabling the internal devices to be better assembled and connected. At the same time, the setting of the wrapping portion 1103 may ensure that the conductor 1120 to be stably installed in the housing, and at the same time the conductor 1120 to be protected from being collided by external objects and contacted from the sides, thereby improving safety.

The rear housing 1102 may be provided with a clamping portion 1104 for installing and fixing the conductor 1120. The cross-section of the clamping portion 1104 may be C-shaped. The setting of the clamping portion 1104 may better clamp the conductor 1120 to the rear housing and therefore reduce the risk of it being detached from the housing by, for example, a mating force generated when a plug is being inserted.

The housing may be provided with a mounting portion 1105, the mounting portion 1105 may be arranged around the outer wall of the housing, and the mounting portion 1105 may be provided with a number of mounting holes. Through the arrangement of the mounting portion 1105 and the mounting holes, the socket may be better connected and fixed with the external device, and the stability of the overall structure may be improved.

In some embodiments, components such as the cover 500, shutter 660, front housing 700, and rear housing 800, may be dielectric members molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

In some embodiments, conductive components, such as signal conductors 102, power conductors 104A-D, and ground conductor 106, may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

Although details of specific configurations of conductive elements and housings are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art. For example, although many inventive aspects are shown and described with reference to a charging socket, it should be appreciated that aspects of the present disclosure are not limited in this regard, as any of the inventive concepts, whether alone or in combination with one or more other inventive concepts, may be used in other types of electrical connectors, such as chip sockets, receptacle connectors, etc.

As another example, mounting ends were illustrated as cable mounting ends configured to receive cables. However, other configurations may also be used, such as solder pins, surface mount elements that are designed to fit within pads of printed circuit boards, press fit "eye of the needle" compliant sections, spring contacts, etc.

Such alterations, modifications, and improvements are intended to be within the spirit and scope of the invention. Accordingly, the foregoing description and drawings are by way of example only.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A socket, comprising:

a housing comprising a chamber surrounded by a wall;

a plurality of conductive elements held by the housing and comprising mating ends extending in a mating direction; and a plurality of shutter assemblies disposed inside the chamber and each of the plurality of shutter assemblies comprising:

a cover comprising a plurality of openings, and a movably mounted shutter configured to move into a first position in which the shutter blocks a first portion of the mating end of a respective conductive element of the plurality of conductive elements in the mating direction and a second position in which the shutter blocks a second portion, smaller than the first portion, of the mating end of the respective conductive element of the plurality of conductive elements in the mating direction, the shutter comprising:

a first portion configured to block the mating end of a respective conductive element of the plurality of conductive elements, and a second portion coupled to the first portion and extending radially away from the conductive element and through a respective opening of the plurality of openings of the cover.

2. The socket of claim 1, wherein:

the housing comprises a plurality of columns within the chamber, the plurality of columns extending in the mating direction, each of the plurality of columns comprising a channel extending therethrough;

the plurality of conductive elements are disposed in respective channels of the plurality of columns; and the plurality of shutter assemblies are disposed at distal ends of columns of the housing.

3. The socket of claim 2, wherein:

the plurality of columns each comprises a flange extending into the channel and a ridge extending from an edge of the flange; and edges of the first portions are disposed on the ridge.

4. The socket of claim 3, wherein:

each shutter comprises a shaft disposed between the first portion and second portion such that the first portion and second portion are configured to rotate about the shaft.

5. The socket of claim 2, wherein:

the plurality of columns comprise recesses on side walls; and the covers of the plurality of shutter assemblies are disposed into the recesses of the side walls of the respective columns of the housing.

6. The socket of claim 2, wherein:

the housing comprises a front housing and a rear housing coupled to the front housing; and the plurality of conductive elements comprise mounting ends opposite the mating ends, and the mounting ends extending into the rear housing.

7. The socket of claim 1, wherein:

the plurality of conductive elements are configured for delivering current up to 70 A; and the socket further comprises a conductive element configured for ground and a pair of conductive elements configured for signals.

8. A method of operating a socket comprising a conductive element, at least a portion of the conductive element surrounding a space, and a shutter assembly comprising first portions blocking an entrance to the space and second portions extending from respective first portions and outside a perimeter of the conductive element, the method comprising:

moving the second portions of the shutter assembly towards the perimeter of the conductive element, causing the first portions of the shutter assembly to unblock the entrance to the space, wherein:

the conductive element comprises a mating end configured to receive a mating conductive element inserted along an axis of insertion and a shell;

the mating end of the conductive element comprises a plurality of first beams each comprising a contact portion curving towards the axis of insertion; and the shell of the conductive element comprises a plurality of second beams each comprising a contact portion curving towards the contact portion of a respective one of the plurality of first beams.

9. The socket method of claim 8, wherein:

the second portions are coupled to the first portions and extend radially away from the conductive element; and the entrance to the space is at least partially blocked unless the second portions are simultaneously moved.

10. The method of claim 8, wherein:

the shutter assembly comprises a cover comprising openings extending therethrough; and the second portions of the shutter assembly extend through respective openings of the cover.

11. A socket, comprising:

a conductive element comprising a mating end configured to receive a mating conductive element inserted along an axis of insertion; and a shutter subassembly comprising:

a cover comprising a plurality of openings, and an aperture aligned, along the axis of insertion, with the mating end of the conductive element; and a plurality of shutters pivotably mounted to the cover and configured to pivot between at least a first state and a second state, each of the plurality of shutters comprising:

a first portion configured to block the mating end of the conductive element, and a second portion coupled to the first portion and extending radially away from the conductive element and through a respective opening of the plurality of openings of the cover, wherein a larger portion of the aperture is blocked by the plurality of shutters in the first state than in the second state.

12. The socket of claim 11, wherein:

each of the plurality of shutters is pivotably mounted to pivot around an axis perpendicular to the axis of insertion.

13. The socket of claim 11, wherein, for each shutter:

when the shutter is in the first state, the first portion is aligned, in a direction parallel to the axis of insertion with the mating end of the conductive element such that a first portion of the mating end of the conductive element is blocked by the shutter and the second portion extends outside the cover at a first angle with respect to the axis of insertion; and when the shutter is in the second state, the first portion is offset from the insertion axis such that the second portion of the mating end of the conductive element, smaller than the first portion, is blocked by the shutter and the second portion extends outside the cover at a second angle with respect to the axis of insertion, smaller than the first angle.

14. The socket of claim 13, wherein:

the first portions of the shutters are disposed inside the cover; and the second portions of the shutters extend outside the cover through openings of the cover.

15. The socket of claim 14, wherein:

the cover comprises a plurality of projections disposed between adjacent openings;

the plurality of projections comprise recesses; and each shutter comprises a shaft between the first portion and the second portion and having ends disposed in respective recesses of the projections such that the first portion is rotatable about the shaft.

16. The socket of claim 15, wherein:

each shutter comprises a spring disposed around the shaft and having an extension abutting against the cover.

17. The socket of claim 11, wherein, for each shutter:

the first portion extends in a first plane parallel to a second plane in which the second portion extends.

18. The socket of claim 17, wherein:

each shutter comprises a transition portion disposed between the first portion and the second portion and a shaft disposed between the first portion and the transition portion.

19. The socket of claim 11, wherein:

the mating end of the conductive element comprises a plurality of beams each comprising a contact portion curving towards the axis of insertion.

20. The socket of claim 19, wherein:

the conductive element comprises a shell comprising a plurality of tips curving towards ends of the beams.

21. The socket of claim 19, wherein:

the plurality of beams are a plurality of first beams;

the conductive element comprises a shell comprising a plurality of second beams; and each of the plurality of second beams comprises a contact portion curving towards the contact portion of a respective one of the plurality of first beams.

22. The method of claim 8, comprising:

removing a force applied to move a second portion of the shutter assembly such that the second portion of the shutter assembly returns to a rest state, wherein returning to the rest state comprises moving to at least partially block the entrance to the space.

* * * * *